(12) United States Patent
Mittal et al.

(10) Patent No.: US 11,625,475 B2
(45) Date of Patent: Apr. 11, 2023

(54) AUTOMATIC PROVISIONING AND INTEGRATION OF DEVICES

(71) Applicant: Microsoft Technology Licensing, LLC, Redmond, WA (US)

(72) Inventors: Rahul Mittal, Bellevue, WA (US); Koji Kato, Redmond, WA (US); Prasad Gholve, Bangalore (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/369,215

(22) Filed: Jul. 7, 2021

(65) Prior Publication Data

US 2023/0008333 A1    Jan. 12, 2023

(51) Int. Cl.
| | | |
|---|---|---|
| *G06F 21/44* | (2013.01) | |
| *G06F 21/34* | (2013.01) | |
| *H04L 9/40* | (2022.01) | |
| *G06F 21/45* | (2013.01) | |
| *G06F 21/60* | (2013.01) | |
| *H04L 29/06* | (2006.01) | |

(52) U.S. Cl.
CPC .............. *G06F 21/44* (2013.01); *G06F 21/34* (2013.01); *G06F 21/45* (2013.01); *G06F 21/604* (2013.01); *H04L 63/0823* (2013.01); *H04L 63/0838* (2013.01); *H04L 63/0853* (2013.01); *H04L 63/105* (2013.01); *G06F 2221/2111* (2013.01)

(58) Field of Classification Search
CPC .......... G06F 21/44; G06F 21/34; G06F 21/45; G06F 21/604; H04L 63/0823; H04L 63/0838; H04L 63/0853; H04L 63/105
See application file for complete search history.

(56) References Cited

U.S. PATENT DOCUMENTS 9,130,753 B1 *   9/2015   Kronrod ............... H04L 9/0822

* cited by examiner

*Primary Examiner* — Edward Zee
(74) *Attorney, Agent, or Firm* — Schwegman Lundberg & Woessner, P.A.

(57) ABSTRACT

A method and system for automatic device provisioning includes a computer system for authenticating a user using a first device. The computer system receives a request for automatic provisioning of a second device. An authentication token and a request identifier of the request is associated with a provisioning data structure for the user. The request including the authentication token is sent to a third device. The computer system receives a unique identifier for the second device from the third device. Based on a determination that the unique identifier and the authentication token of the second device match the unique identifier and authentication token in the provisioning data structure, authenticate the second device, retrieve a configuration profile for the user, and cause application of the configuration profile to one or more settings of the second device.

20 Claims, 8 Drawing Sheets

AUTOMATIC PROVISIONING AND INTEGRATION OF DEVICES

TECHNICAL FIELD

The present disclosure generally refers to methods and systems for automatic provisioning and integration of devices in accordance with some embodiments.

BACKGROUND

The use of software and hardware technologies have become commonplace. In performing daily tasks, typically, several hardware and software technologies are utilized for various purposes. Phones, laptops, printers, speakers, and televisions are just a few of the hardware technologies utilized on a frequent basis. With the plethora of hardware devices being used it is inevitable that some equipment may need to be upgraded and or replaced.

SUMMARY

The proliferation of electronic devices into everyday life has become undeniable. However, at some point, the electronic devices reach the end of their useful life and require replacement. Providing new and/or replacement devices for many people across an organization requires impeccable organization and management skills. Instead of manually ordering, receiving, and installing electronic devices, methods and systems contemplated herein provide a novel, streamlined, integrated platform that manages provisioning and integration of electronic devices.

Embodiments of the present disclosure include a method and system for automatic device provisioning that alleviates problems associated with procurement and provisioning of new hardware devices. In some examples, a method for automatic device provisioning includes authenticating a user using a first device accessing a network-based service. The method includes receiving a request for automatically provisioning a second device, the provisioning including authenticating the second device and the provisioning is associated with a request identifier. The method includes associating an authentication token and the request identifier with a provisioning data structure for the user. The method includes sending the request, the request identifier, and the authentication token to a third device. The method includes receiving, from the third device, a unique identifier of the second device and the request identifier. The method includes locating the provisioning data structure using the request identifier and updating the provisioning data structure to include the unique identifier of the second device. The method includes receiving, at the network-based service, an authentication request for the second device including the authentication token and the unique identifier of the second device. The authentication token having been pre-provisioned on the second device by the third device. The method includes identifying the provisioning data structure based upon the unique identifier and in accordance with a determination that both the authentication token and unique identifier included in the authentication request match both the authentication token and the unique identifier of the second device in the provisioning data structure, authenticating the device, retrieving a configuration profile based on the provisioning data structure for the user and causing application of the configuration profile to one or more settings of the second device.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

This Summary is provided to introduce a selection of concepts that are further described below in the Detailed Description. It is not intended to identify key features or essential features of the claimed subject matter, nor is it intended to be used to limit the scope of the claimed subject matter.

BRIEF DESCRIPTION OF THE SEVERAL VIEWS OF THE DRAWINGS

The disclosed aspects will hereinafter be described in connection with the appended drawings that are provided to illustrate and not to limit the disclosed aspects.

DETAILED DESCRIPTION

Device procurement from third party systems pose a number of technical problems that threaten the security and integrity of the network to which procured devices are connected. For example, when users receive a device and power it on; there may be a number of settings that need to be configured in order to successfully connect. Misconfigured devices, even those that may be only temporarily misconfigured, may cause a number of technical problems such as wasted network resources when the device fails to connect (and subsequently retries); wasted power as a result of the failures to connect (and the subsequent retries); the unconfigured or misconfigured device may become a target for hackers and other malicious users who may take advantage of more permissive initial settings; reduced performance; and the like. Furthermore, a misconfigured device can compromise the network even if there is no malicious intent. For example, the device may continually try to connect to a server. The connection attempt may fail due to the misconfiguration. This may reduce the amount of resources available to other clients. Too many misconfigured devices may cause a Denial of Service (DOS) to properly configured devices.

The present disclosure provides technical solutions to these problems. By providing an automated device provisioning and configuration service, the system ensures that the devices arrive optimally configured. This means that the devices already have the proper settings and thus, the technical problems created by these misconfigured devices are solved as the devices should be optimally configured and ready to connect without issues. For example, the amount of wasted network resources are reduced as the device is configured according to the settings of the network to which it is to be used. In addition, by coming preconfigured, or being configured quickly thereafter, the device may be configured with the proper security settings and may no longer be vulnerable to hackers. Furthermore, the danger to existing network resources is reduced or eliminated. These objectives are met by the technical solutions presented herein; such as by automatically provisioning the device which is provided by a third party, with authentication information and/or one or more settings.

In order to provide these technical solutions, other technical problems arose and were addressed with technical solutions. For example, a first system that requests a device from a second system does not have a way of identifying the newly procured device and thus will not recognize the device upon that device connecting to the network. This may cause delays in authenticating and configuring devices (e.g., especially with networks that only allow devices on a list of permitted devices to access the network). This technical problem is solved by using a provisioning data structure that correlates a request identifier with an authentication token and a unique identifier of the provisioned device. The second system provides the unique identifier of the device; while also storing the authentication token on the device prior to delivery to the user. When the newly provisioned device attempts to connect to the network, the authentication token and the unique identifier may be provided to the system. The system may then recognize this token and identifier and admit the new device. This leads to faster authentication and recognition of a new device in the network. The system may also use this information to retrieve configuration information for the device and to configure the device.

It is understood that this solution is not solely reserved for automatic provisioning and integration of devices but may include any application providing content and/or devices to users.

The term "provisioning" is used herein to describe operations involved to modify, update, or evolve a device to a state in which it can be provided to an end user.

The term "authenticating" is used herein to describe operations involved to verify a user or device's identity.

The inventive subject matter will now be discussed with reference to several example implementations. It is to be understood that these implementations are discussed for enabling those skilled in the art to better understand and thus implement the embodiments of the present disclosure, rather than suggesting any limitations on the scope of the present disclosure.

Examples disclosed herein are directed to methods, apparatus comprising several modules and apparatus comprising one or more processors and memory embodied with executable instructions for providing seamless device provisioning and integration services.

Having generally provided an overview of some of the disclosed examples, attention is drawn to the accompanying drawings to further illustrate some additional details. The illustrated configurations and operational sequences are provided to aid the reader in understanding some aspects of the disclosed examples. The accompanying figures are not meant to limit all examples, and thus some examples may include different components, devices, or sequences of operation while not departing from the scope of the disclosed examples discussed herein. In other words, some examples may be embodied or may function in different ways than those shown.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

Figure 1:
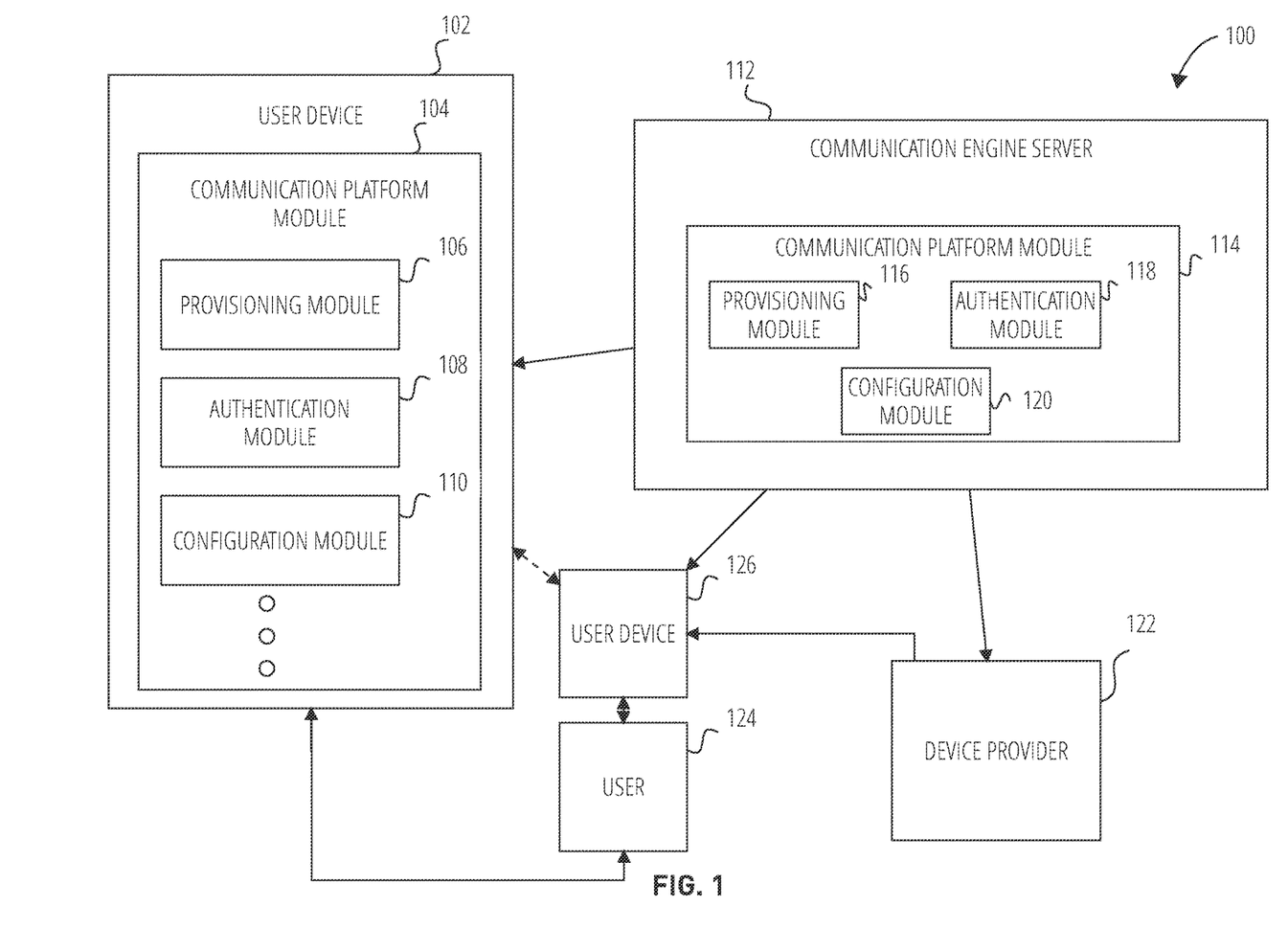
FIG. 1 illustrates a block diagram of an example system for automatic provisioning and integration of devices in accordance with some embodiments.

FIG. 1 illustrates a block diagram of an example system for automatic provisioning and integration of devices in accordance with some embodiments. System 100 provides automatic provisioning and integration of devices for a user 124 via user device 102 for a separate, new user device 126. The automatic provisioning and integration of user device 126 may be provided through a communication platform module 114 available on either the user device 102 and/or on the communication engine server 112. System 100 also includes device provider 122 (e.g., device manufacturer, supplier) in communication with the communication engine server 112 (e.g., a Microsoft Teams server) to send and receive communications regarding device procurement. Communication engine server 112 along with communication platform module 104 may also provide communication services between two or more devices. Example communication services may include Microsoft Teams, Skype, Outlook, and other similar applications and/or platforms. Example communications may include real time or near real time communications such as online meetings, video calls, chat messaging, content sharing, and the like. Device provider 122 may be one or more computer systems that may provision one or more devices, such as user device 126. Device provider 122 may communicate with the communication engine server 112 and the user device 126. In some examples, device provider may also be in communication with user 124 for provisioning and shipment of devices.

Communication platform module 104 may be an instance of an application (e.g., Microsoft Teams) to facilitate communication between the user device 102 and one or more other devices in conjunction with the communication engine server 114. The communication platform module 104 may facilitate communication between user device 102 and communication engine server 112 via a graphical user interface (GUI). In some embodiments, the GUI may be provided by the communication engine server 112 for display at the user device 102. As shown and described in FIGS. 2-3, the GUI may provide a visual aid for automatic provisioning and integration of devices. The displayed GUI may include HyperText Markup Language (HTML), scripting files, content style sheets, code modules, scripting files, or the like.

Communication platform module 104 of user device 102 may include provisioning module 106, authentication module 108, and configuration module 110 among others. User device 102 may include various other modules and submodules not shown in FIG. 1. Authentication module 108 may authenticate the user of the user device 102 and/or the user device 102 itself to the communication engine server 114. For example, by providing credentials (e.g., username/ password, a key, a token, or the like). Once the user device 102 and the communication platform module 104 is authenticated to the communication engine server 114, the functions of the communication engine server 112 are exposed to the user of user device 104. Configuration module 110 allows the user to set various configuration parameters for the user device 102, and, in the example in which the user of the user device 102 is an administrator, the configuration module 110 may allow the user to set various configuration parameters for other users and other devices. The configurations set by the configuration module 110 may include settings stored on either the user device 102 and/or the communications engine server 112. Settings may relate to the communications provided by the communication engine server 112 and may include security settings, device accessibility settings, user preferences, user interface settings, and others.

Figure 2:
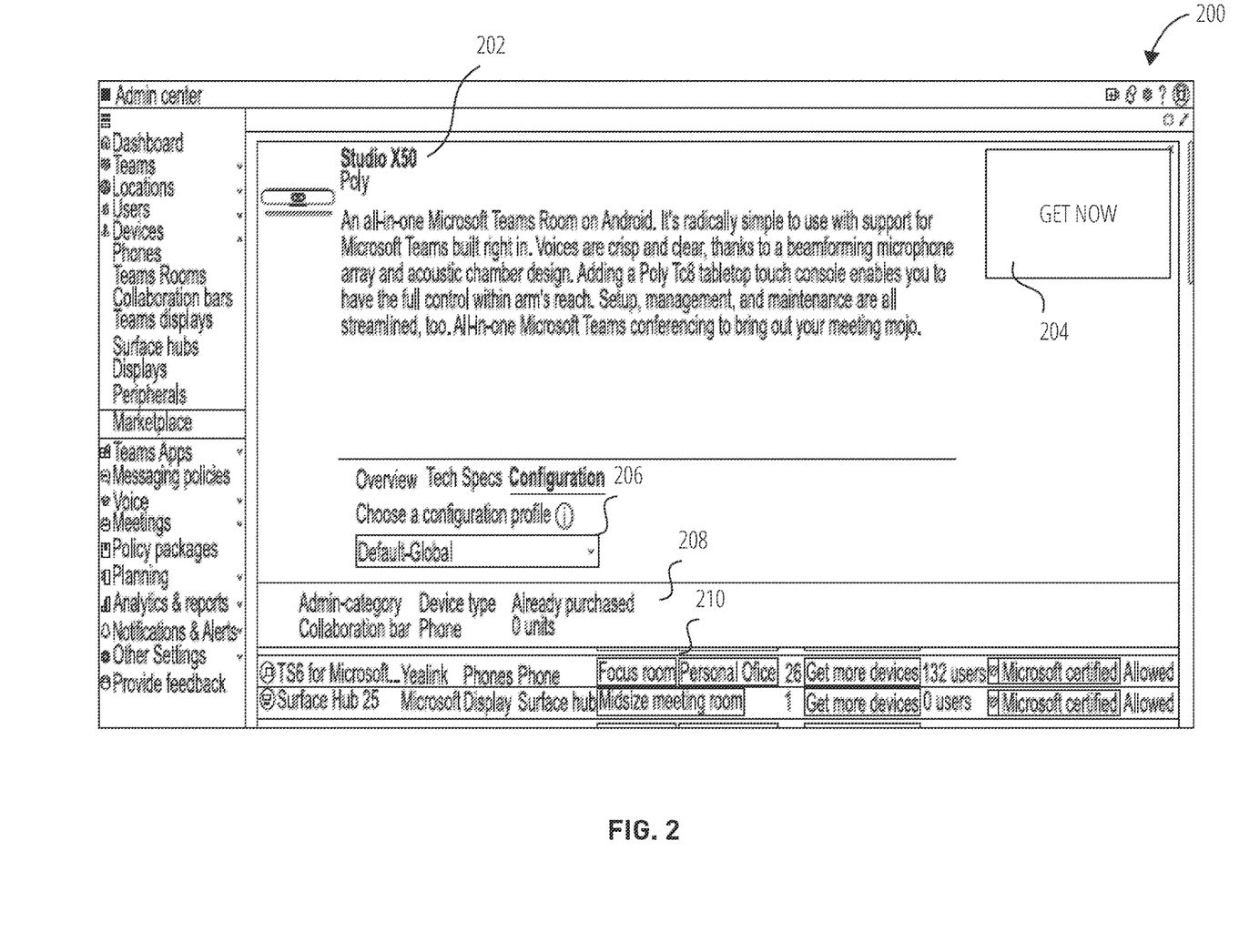
FIG. 2 illustrates an example user interface application for automatic provisioning and integration of devices in accordance with some embodiments.

Provisioning module 106 can process device procurement requests from the user 124 and process provisioning of the requested device(s) along with provisioning module 116 of the communication engine server 112. For example, provisioning module 106 can receive provisioning requests from a user through one or more of the GUIs provided by the communication platform module 104, such as shown in FIG. 2. The provisioning request may include information about the user 124, the device 126, a user or network of the user device 102, information about the communication engine server 114, and the like. For example, the fields shown in FIG. 2.

In some embodiments, a device provisioning data structure is created at the provisioning module 106. The provisioning data structure may information about the user 124, the device 126, a user or network of the user device 102, information about the communication engine server 114, and the like. In addition, the provisioning data structure may have a request identifier that may be created to identify a particular request. The provisioning data structure may also have one or more fields for device identification information that may be specific to the user device 126, such as a Medium Access Control address, a UUID, and the like. The provisioning request may be sent to the communication platform module 114 and in particular the provisioning module 116. The provisioning request may include the provisioning data structure. In other examples, the provisioning data structure may be created by the communication platform module 114 in response to the request. The provisioning data structure may be stored at the communication platform module 114 and/or the user device 102.

Provisioning module 116 may receive the provisioning request and, if not already done, generate the provisioning data structure and store it. Provisioning module 116 may contact the authentication module 118 to generate one or more authentication tokens. The authentication token may be specific to the user device 126 and/or the user 124 and, alone, or in conjunction with other information may allow the newly provisioned device to authenticate with the communication engine server 112. In some examples, the authentication module 118 may also generate a challenge-response. For example, a unique pin (e.g., one time passcode (OTP)) that the user 124 would enter and would be sent along with the token to authenticate. In some examples, the authentication token authenticates the user 124 on the basis of the authenticated user device 102 and/or the user that authenticated with user device 102. The authentication token and the challenge-response may be stored in the provisioning data structure. Provisioning module 116 may receive configuration information and/or settings and may store these within the provisioning data structure as well. The provisioning data structure may be stored with other provisioning data structures and may be indexed and located based upon the request identifier and/or data about the device and/or the user.

Provisioning module 116 may send the authentication token and information about the user device 126 to one or more computing devices associated with the device provider 122. The device provider 122 may select a device from inventory based upon the type of device requested, preload the authentication token to the device, and in some examples, preload a configuration to the device. The device provider 122 may provide, to the communication platform module 114, a unique identifier of the actual device 126. The unique identifier may include a UUID, MAC Address, or the like. The communication platform module 114 may include the unique identifier in the provisioning data structure. In some examples, the provisioning module 116 may also send a configuration of the device to the device provider 122. The device provider 122 may store the configuration on the user device 126. The authentication token and/or configuration may be stored in a prespecified location on the user device 126 where a communication platform module instance on the user device knows to look when it first executes.

Once the user 124 receives the user device 126 and powers it on, the user device 126 may be configured to find the authentication token and/or configuration information; apply the configuration information; and contact the communication platform module 114 to authenticate using the authentication token and/or the unique identifier of the user device 126. In some examples, the user device 126 asks the user 124 for the challenge-response and provides the challenge response as part of the authentication. The user device 126 may pass the authentication token, unique identifier, and/or challenge-response to authentication module 108. Authentication module 108 is configured to authenticate one or more devices within a networked environment. For example, the authentication module will compare the unique identifier of the user device 126 to find the provisioning data structure. The authentication token in the provisioning data structure may be compared with the authentication token submitted by the user device 126. If the authentication tokens match along with the unique identifiers and/or the challenge-response then the user 124, and/or the device 126 may be authenticated to the communication engine server 114.

In some examples, once the device 126 is authenticated, the configuration module 120 may provide the device with one or more configuration profiles for the user 124 as stored in a provisioning data structure. The configuration module 120 may obtain information from the provisioning data structures of authentication module 108. The configuration profiles for the user may include device specific settings, security profiles, and other personal settings previously selected by the user. As previously noted, the configuration profiles may be provided to user device 126 for installation on the device. That is, the configuration module 120 may send a configuration file to the user device 126. The configuration profiles may be installed on user device 126 automatically without manual intervention in response to the authentication. In some embodiments, various configuration profiles may be stored by configuration module 110 and/or configuration module 120 at the communication engine server 112. For example, user 124 has a first configuration profile for a telephone device and a second configuration profile for a laptop computer device. Each of the configuration profiles are maintained at the configuration module 110 and/or 120 and associated with the user 124.

In some examples, the functions of the various modules, such as the provisioning module 116, configuration module 120, and authentication module 118 may be provided by the user device 102.

Figure 3:
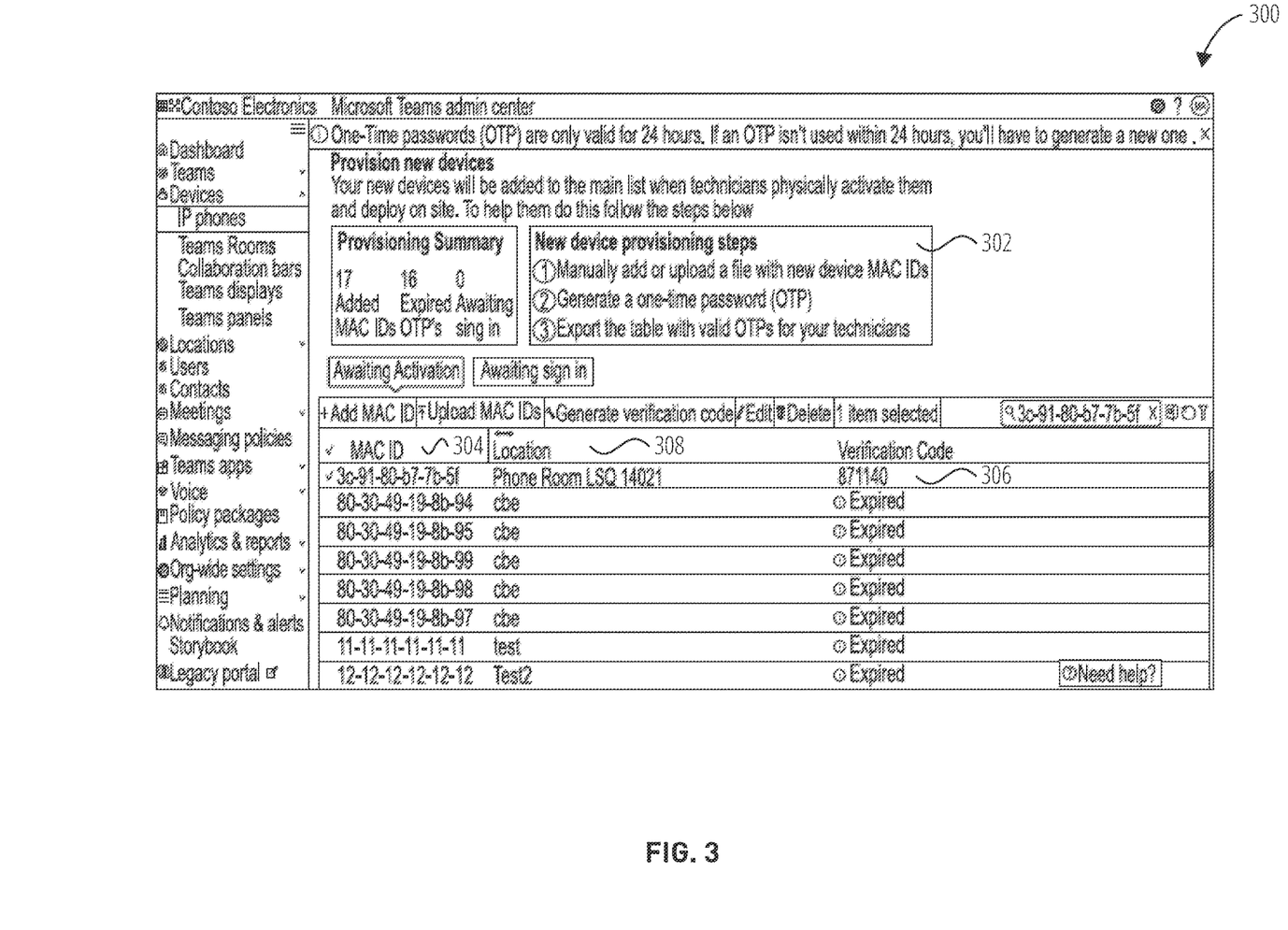
FIG. 3 illustrates a second view of an example user interface application for automatic provisioning and integration of devices in accordance with some embodiments.

FIG. 2 illustrates an example user interface application for automatic provisioning and integration of devices in accordance with some embodiments. Graphical user interface (GUI) 200 includes an example view of a graphical user interface of a communication platform (e.g., Microsoft Teams Admin Center) that interfaces to securely procure electronic devices. GUI 200 may be provided by communication engine server 112 for display on the user device 102 by communication platform module 104 of FIG. 1 in accordance with some examples. In some examples, the GUI may be provided for display on an electronic device distinct from a user's normal, or typically used device. A user may use his or her user credentials to authenticate him/herself with the communication platform and further use the GUI after authentication. As such, the user need not use a specific electronic device to access GUI 300.

As shown, electronic device 202 is an available device to be procured through a GUI provided by the communication platform (e.g., communication platform module 114). An electronic device 202 that is not currently part of a user's electronic device repertoire may be available for procurement via the communication engine server 112 and provisioned and provided by device provider 122 of FIG. 1. By clicking the button 204 labeled "Get Now", the user (e.g., user 124 of FIG. 1 and also referred to herein as the user) can request procurement of the electronic device 202.

In some embodiments, prior to submitting the procurement request, the user may select various configuration profiles 206 using the drop-down menu provided by the communication platform. In some embodiments, a user can select a configuration profile available to multiple people (e.g., a global profile). In some embodiments, a user can select a private configuration profile. The private configuration profile may be specific to the user accessing the GUI. Additional configuration profiles may include security and privacy settings to be applied to a device that allows an administrator to monitor the use and/or activity of the device.

GUI 200 may provide additional information including a number of procured units 208, a physical location of device 210, and various other information regarding the electronic device including model, description, category, device type, and number of previously procured devices can be seen within GUI 200.

FIG. 3 illustrates a second view of an example graphical user interface application for automatic provisioning and integration of devices in accordance with some embodiments. Graphical user interface 300 includes a second example view of a communication platform (e.g., communication platform module 104) and may be an extension of GUI 200. GUI 300 includes a view of the communication platform after the user has submitted a procurement request for an electronic device (e.g., electronic device 202, FIG. 2).

Portion 302 of GUI 300 provides details regarding an authentication task provided to the user for installing various programs on the newly acquired electronic device (e.g., electronic device 202). It is understood that in some examples, the user need not perform the installation. In some embodiments, the installation is performed automatically through the communication platform, via a third party (e.g., IT technician), or virtually (e.g., through a virtual private networks (VPN)).

Portion 304 includes a log of a unique device identifiers (e.g., MAC id's) for each device of the user. As described in detail with regards to FIG. 5, unique device identifiers are provided by a device provider (e.g., device provider 122) to identify and map the device to the user. Additionally, the unique device identifier is used to automatically provision the associated device without manual intervention as described in greater detail with regard to FIG. 6.

Information displayed with respect to portion 304 may be stored in one or more provisioning data structures that the user has access to. For example, if the user is an administrator of an organization, information from the provisioning data structures pending for the organization may be displayed. Portion 306 includes details of a verification code that is sent to the device to verify and/or authenticate the device for use by the user. As described with greater detail in FIG. 5, a challenge-response in the form of a verification code may be provided to the new, secondary device (e.g., electronic device 202, FIG. 2, user device 126, FIG. 1). The verification code is used to verify the identity of the device to the network and may additionally be used to authenticate the device. In some examples, the verification code is a six digit number, a password, a token, or a security certificate. In some embodiments, the user is not the only user accessing the device. The user may be procuring devices on behalf of other users and maintain a log of active, pending, and inactive devices.

GUI 300 includes physical location information 308 to manage a physical installed location of each electronic device. In some embodiments, an expected physical location of a device is stored in the user's provisioning data structure. Once the device is determined to be at or within a threshold distance (e.g., 200 feet) of the expected physical location, the device may be authenticated. GUI 300 may maintain a log of physical locations associated with each electronic device of the user. Additionally, GUI 300 may provide a graphical representation of each electronic device of the user and its respective location.

Physical location may be determined based upon GPS data provided by the device when it attempts to authenticate, an IP address mapping to a location (e.g., IP Addresses may be mapped to various locations or rooms), or the like.

Figure 4:
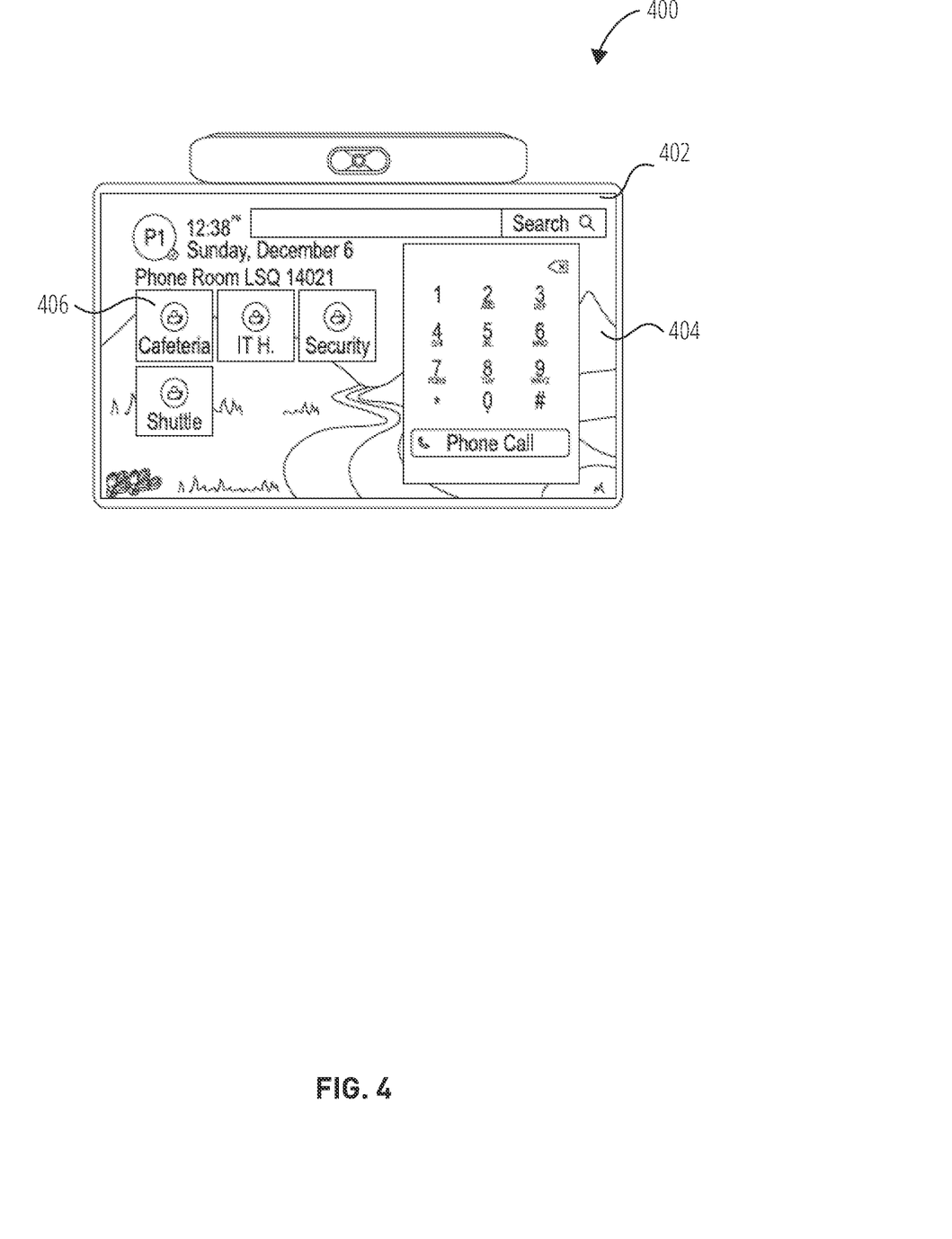
FIG. 4 illustrates an example user interface of a hardware electronic device in accordance with some embodiments.

FIG. 4 illustrates an example user interface of a hardware electronic device in accordance with some embodiments. Hardware electronic device 400 includes a user interface 402. The hardware electronic device may be the requested electronic device 202 of FIG. 2. After successful installation of one or more programs to the device 400, the user interface 402 may reflect one or more configuration profiles applied for the user at the device.

For example, device 400 is a desk phone to be used in an office of a user. The user may have various configuration profiles specific to various devices and an appropriate configuration profile for a desk phone may include preconfigured settings specific to the preferences of the user, or user of the device. In some embodiments, the user prefers a background image of mountains 404 and prefers pre-installed shortcuts for contacting the cafeteria, IT, security, and the company shuttle 406. These such preconfigured settings, or configuration profiles are automatically applied to the device 400.

Figure 5:
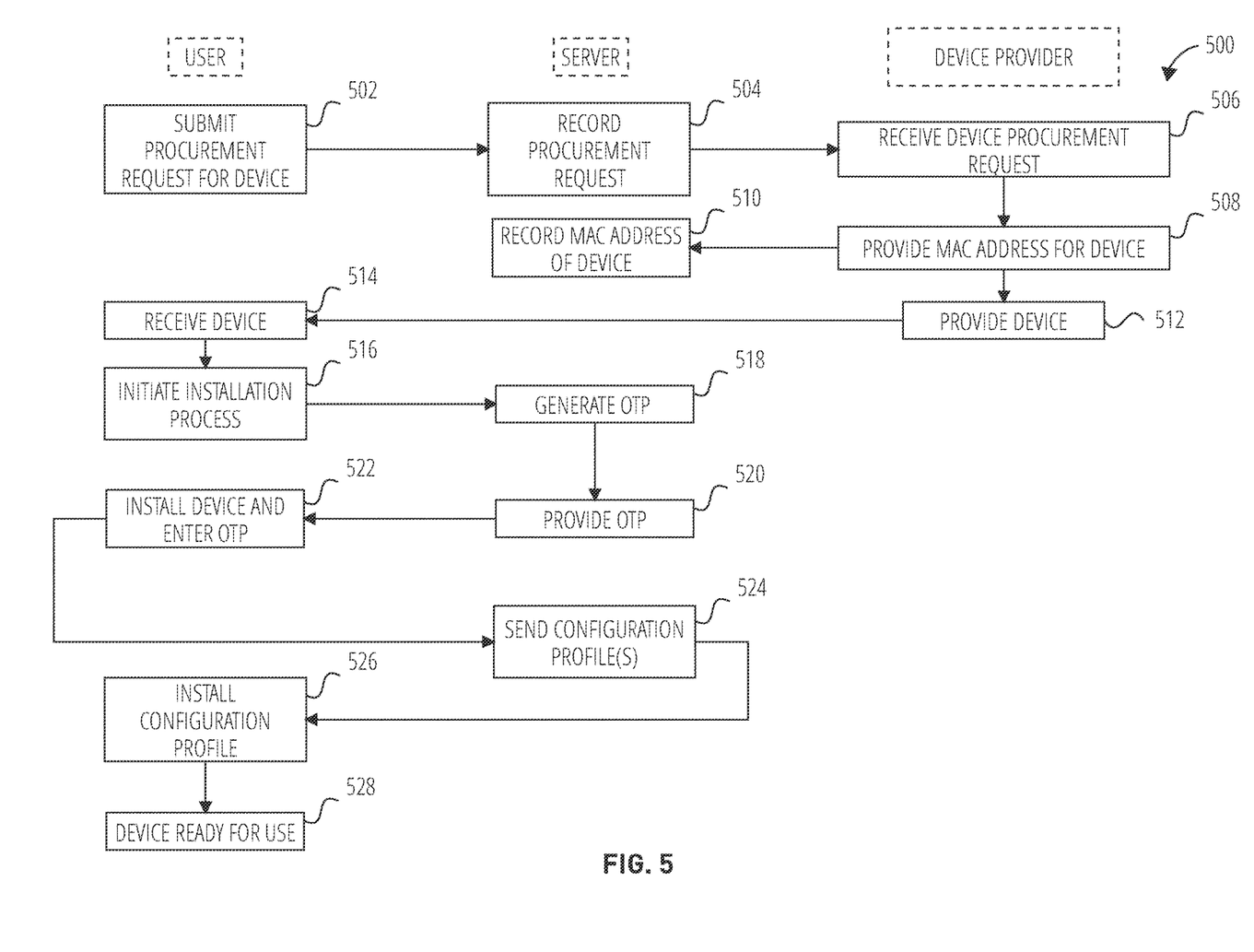
FIG. 5 illustrates a swim-lane flow diagram for providing automatic provisioning and integration operations in accordance with some embodiments.

FIG. 5 illustrates a swim-lane flow diagram for providing automatic provisioning and integration operations for a received device in accordance with some embodiments. Method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Method 500 begins at operation 502, a user (e.g., tenant) requests procurement of a device through a communication platform (e.g., Microsoft Teams). For example, an IT manager (e.g., tenant) makes a procurement request (e.g., via GUI 200, GUI 300) for a new projector to be placed in a conference room through an online communication platform. The online communication platform may provide a GUI that allows administrators or IT managers to select from available devices, provide information on intended end users, and provide configuration information as previously described.

At a server system (e.g., communication platform server), operation 504 includes recording the procurement request made by the user. In some embodiments, the procurement request is recorded and saved as part of the user's profile (e.g., as part of a provisioning data structure associated with the user for the communication platform module 104, FIG. 1). The procurement record may include a device identifier (e.g., make and model), a request identifier (e.g., invoice number), an authentication token (e.g., security certificate), and other identifiers related to the procurement of the device. Each entry from the procurement record may also be stored in a data structure (e.g., provisioning data structure) for future reference and access. In addition, authentication information (e.g., token) and/or configuration information may be generated. This information may be sent to the device provider.

At the device provider, the device provider (e.g., device provider 122) receives the device procurement request (operation 506) and provides the unique identifier (e.g., MAC address) for the device (operation 508) to be sent to the server. The server at operation 510 receives the unique identifier (e.g., MAC Address) from the device procurement center and records the unique identifier of the procured device and in some embodiments, associates the unique identifier of the procured device with the user and/or the user's profile within the provisioning data structure.

At operation 512, the device provider is configured to provide the device to the user. The user receives the device at operation 514 and initiates the installation process (operation 516). The installation process may include powering the device on. The installation process may further include connecting to an internet connection through a local-access network, wireless network, or other suitable connection. Once the device initiates the installation process, the server generates a one-time passcode (OTP) to be used to authenticate the device and configure the device for the user (operation 518). The server then sends the OTP or other suitable authentication task to the user at operation 520. In some examples, the OTP may be provided and/or generated in earlier steps. In some examples where a user is provided with multiple devices, the server is configured to provide a single OTP to be used to authenticate each device. In some embodiments, the OTP is provided after the user receives each device from the device procurement request.

The user receives the OTP from the server and installs the device by entering the OTP at operation 522. The device may also be authenticated in other ways, including determining that an authentication token and the unique device identifier matches the authentication token and unique device identifier stored in a provisioning data structure of the user of the device.

In some embodiments, once the device is shipped from the device provider to the user, the server receives a notification that the device is en route to the destination (e.g., to the user) and the notification and/or a visual representation of the device may also be displayed graphically (e.g., GUI 200, GUI 300).

After the device is successfully authenticated, the server sends one or more configuration profiles associated with the user for installation on the device (operation 524). configuration profile may include various settings and permissions associated with the user. When in some embodiments, the device does not have any associated, selectable configuration profiles, the device is provided to the user without any settings or permissions installed. In some embodiments, when a configuration profile is unavailable for either the device or for the user, the server provides the user with an option to create a new configuration profile and stores the new configuration profile in a data structure associated with the user. In some embodiments the server prompts the user to create a new configuration profile prior to authentication of the device.

At operation 526, the device of the user receives and installs the one or more configuration profiles and at operation 528, the device is ready for use.

After the procurement request has been made, the unique identifier of the device for procurement is added to the user's profile on the communication platform. Continuing the example from above, the IT manager has a profile with the communication platform, to which the unique identifier of her new projector is added.

The operations of method 500 may be repeated for multiple devices to be provisioned and integrated for the user.

Figure 6:
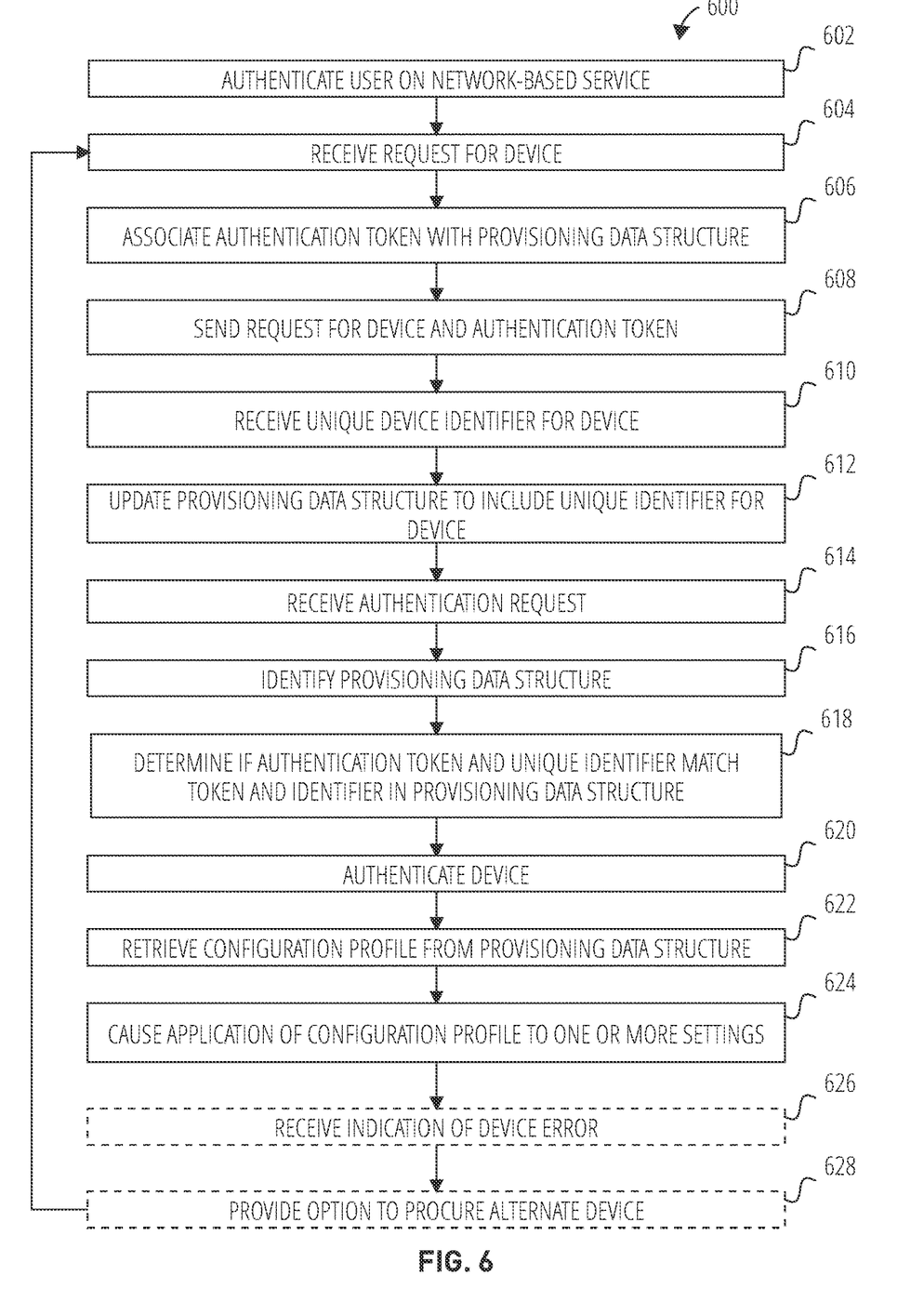
FIG. 6 illustrates a method for providing automatic provisioning operations in accordance with some embodiments.

FIG. 6 illustrates a method 600 for seamless device provisioning in accordance with some embodiments. Method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Method 600 begins at operation 602 where a computing device (e.g., mobile computing device user device 102, FIG. 1) authenticates a user using a first device on a network-based service (e.g., Microsoft Teams).

At operation 604, the computing device receives a request via a graphical user interface corresponding to the network-based service, for automatically provisioning a second device, the provisioning comprising authenticating the second device and the provisioning being associated with a request identifier. The second device is distinct from the first device and the computing device.

At operation 606, the computing device associates an authentication token with a provisioning data structure associated with the user. For example, a data structure includes data specific to the user including device names, types, configuration settings, configuration profiles, authentication tokens, and device identifiers.

The computing device at operation 608 sends a procurement request, the request identifier, and the authentication token for the second device to a third computing device (e.g., device supplier), distinct from the computing device, the first device, and the second device. In some embodiments, the computing device generates a security certificate to be installed on the second device and provides the security certificate to the third computing device to install the security certificate on the second device. In some embodiments, authenticating the second device includes verifying the security certificate installed on the second device matches the generated security certificate that was sent to the third computing device.

At operation 610, the computing device receives a unique device identifier of the second device from the third computing device. The unique device identifier may include a MAC address specific to the device. Additional information including product identifier, product name, model number, order number, stock keeping unit number (SKU number), etc. may be collected and stored.

At operation 612, the computing device updates the provisioning data structure to include the unique identifier of the second device and the authentication token. For example, user A sends a procurement request for device B. When the manufacturer of device B sends a unique device identifier for user A's device B, the unique device identifier is stored under user A's provisioning data structure.

In some embodiments, the computing device stores a location of the device to be configured in the network. For example, user A's requested device B is to be installed in conference room C. The location, conference room C, is stored at the communication platform in association with the profile of the user (e.g., provisioning data structure).

At operation 614, the computing device receives an authentication request for the second device. The authentication request includes the authentication token pre-provisioned on the second device and the unique identifier of the second device. In some embodiments, the computing device receives an indication from the third computing device that the authentication token is pre-provisioned on the second device. In some embodiments, the computing device determines that the device is at the location to be installed (e.g., conference room C) prior to providing the user with the authentication task. In some embodiments, the authentication task includes sending the user a one-time passcode through the communication platform to be inputted at the device. In some embodiments, the authentication tasks include verifying the security certificate installed on the device matches the generated security device.

At operation 616, the computing device identifies the provisioning data structure based upon the unique identifier of the second device. In some embodiments, the provisioning data structure is identified based upon either the authentication token, the unique identifier of the second device, or both the authentication token and the unique identifier of the second device.

The computing device at operation 618 then determines if the authentication token and the unique identifier included in the authentication request matches the authentication token and the unique identifier of the second device in the provisioning data structure. In accordance with a determination that the authentication token and the unique identifier of the authentication request matches the authentication token and the unique identifier of the second device in the provisioning data structure, authenticate the second device (operation 620).

The computing device then retrieves a configuration profile from the provisioning data structure for the user (operation 622) and causes application of the configuration profile to one or more device settings of the second device at operation 624.

In some embodiments, after successful authentication of the device, the computing device configures the device for the user to be used on the user's network. Responsive to successful authentication of the device, the computing device provides the configuration profile for installation on the device. For example, a configuration profile includes settings, wallpaper, passcodes, privacy rights, security certificates, access rights, and other configuration settings particular to the user. In some embodiments, the configuration profile is generated for the user based at least in part on an access level of the user. As an example, user A procures device B. User A has a high access level and has full control of the device. However, user C also procures a device D. User C has a low access level and is allowed limited access or control of the device commensurate with user C's access level.

In some embodiments, a configuration profile is unavailable for the device, or the user does not have a configuration profile to be applied to the second device. In such scenarios, the device is configured using the standard out-of-box configuration profile installed by the manufacturer.

In some embodiments, after the device has been authenticated, the computing device displays a graphical representation of the device within a domain of the user. For example, an office layout diagram includes multiple conference rooms and device B is identified as a graphical icon of an electronic device installed and/or located in conference room C.

Optionally, at operation 626 the second device receives an indication of an error at the device. In some embodiments, in accordance with the second device receiving a threshold number of error indicators at the device, an option to procure an alternate device is provided to the user at operation 628. For example, a defect and/or issue arises with the device and a replacement device is desired. The user may be provided with an option to procure another device that is the same make and model of the originally procured device to replace the faulty original device. After operation 628, the computing device may receive a request for an alternate device at which the operations 604-618 of method 600 may be repeated.

Figure 7:
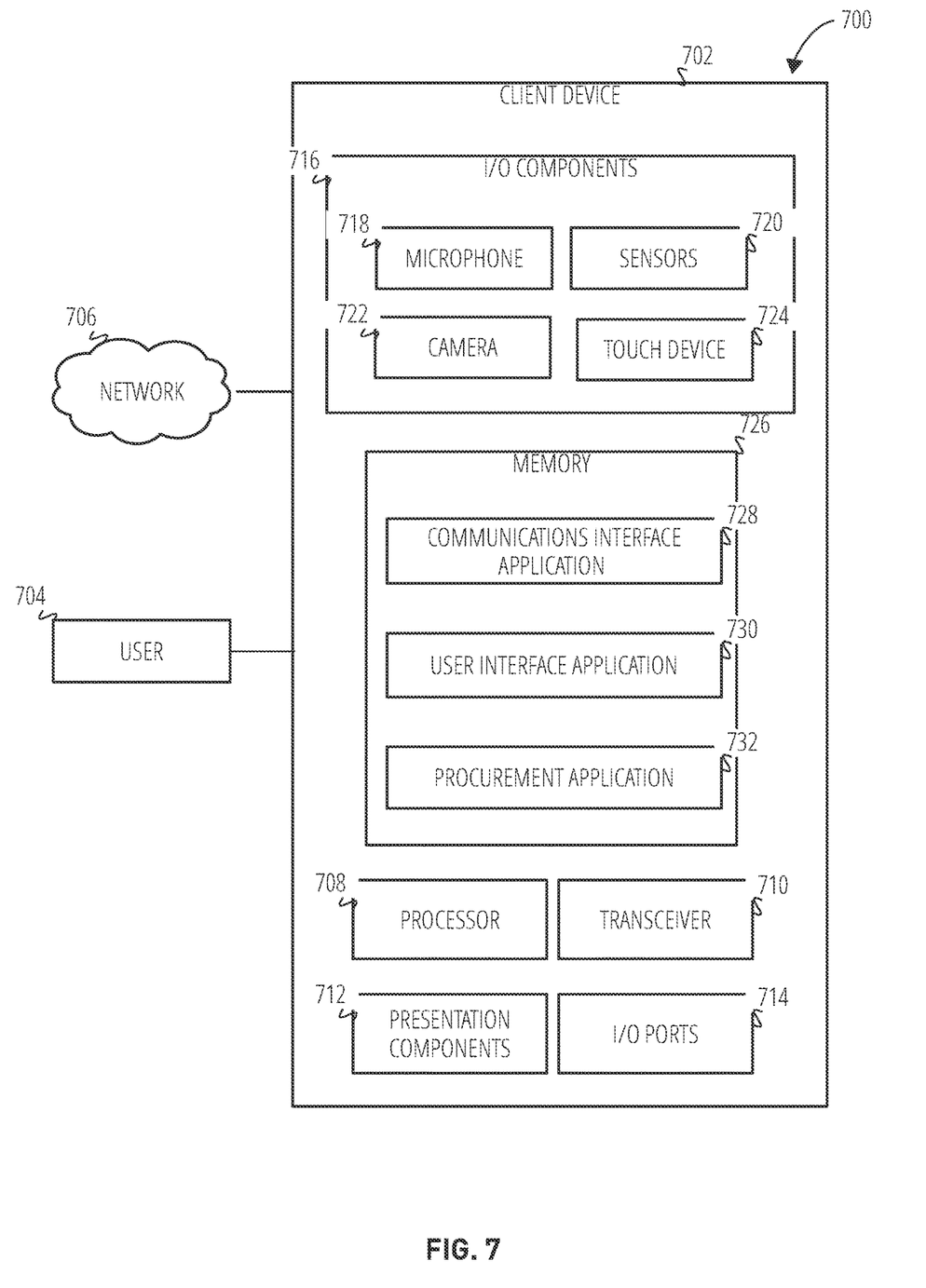
FIG. 7 is a block diagram of an example networked system depicting an environment in which embodiments may operate.

FIG. 7 depicts a block diagram that illustrates an example environment 700 including example client device 702 for collecting and providing user and environment data. In some examples, the client device 702 has at least one processor 708, a transceiver 710, one or more presentation components 712, one or more input/output I/O ports 714, and a memory 726.

The client device 702 may take the form of a mobile computing device or any other portable device, such as, a mobile telephone, laptop, tablet, computing pad, notebook, gaming device, portable media player, etc. The client device 702 may also include less portable devices such as desktop personal computers, kiosks, tabletop devices, industrial control devices, etc. Other examples may incorporate the client device 702 as part of a multi-device system in which two separate physical devices share or otherwise provide access to the illustrated components of the computing device 702.

The processor 708 may include any quantity of processing units and is programmed to execute computer-executable instructions for implementing aspects of the disclosure. The instructions may be performed by the processor or by multiple processors within the computing device or performed by a processor external to the computing device. In some examples, the processor 708 is programmed to execute methods such as the one illustrated in accompanying FIGS. 5-6.

Additionally, or alternatively, some examples may make the processor 708 programmed to present an experience in a user interface ("UI"), e.g., the UI shown in FIGS. 2-4. Moreover, in some examples, the processor 708 may represent an implementation of techniques to perform the operations described herein.

The transceiver 710 is an antenna capable of transmitting and receiving radio frequency ("RF") signals. One skilled in the art will appreciate and understand that various antenna and corresponding chipsets may be used to provide communicative capabilities between the client device 702 and other remote devices. Examples are not limited to RF signaling, however, as various other communication modalities may alternatively be used.

The presentation components 712 visibly or audibly present information on the computing device 702. Examples of presentation components 712 include, without limitation, computer monitors, televisions, projectors, touch screens, phone displays, tablet displays, wearable device screens, televisions, speakers, vibrating devices, and any other devices configured to display, verbally communicate, or otherwise indicate image search results to a user. In some examples, the client device 702 may be a smart phone or a mobile tablet that includes speakers capable of playing audible search results to the user. In other examples, the client device 702 is a computer in a car that audibly presents search responses through a car speaker system, visually presents search responses on display screens in the car, e.g., situated in the car's dashboard, within headrests, on a drop-down screen, or the like, or a combination thereof. Other examples may present the disclosed search responses through various other display or audio presentation components 712.

I/O ports 714 allow the client device 702 to be logically coupled to other devices and I/O components 716, some of which may be built into client device 702 while others may be external. Specific to the examples discussed herein, I/O components 716 include a microphone 718, one or more sensors 720, a camera 722, and a touch device 724. The microphone 718 captures speech from the user 702 and/or speech of or by the user 704. The sensors 720 may include any number of sensors on or in a mobile computing device, electronic toy, gaming console, wearable device, television, vehicle, or other computing device 702. Additionally, the sensors 720 may include an accelerometer, magnetometer, pressure sensor, photometer, thermometer, global positioning system ("GPS") chip or circuitry, bar scanner, biometric scanner for scanning fingerprint, palm print, blood, eye, or the like, gyroscope, near-field communication ("NFC") receiver, or any other sensor configured to capture data from the user 702 or the environment. The camera 722 captures images or video of the user 704. The touch device 724 may include a touchpad, track pad, touch screen, or other touch-capturing device. The illustrated I/O components 716 are but one example of I/O components that may be included on the client device 100. Other examples may include additional or alternative I/O components 716, e.g., a sound card, a vibrating device, a scanner, a printer, a wireless communication module, or any other component for capturing information related to the user or the user's environment.

Figure 8:
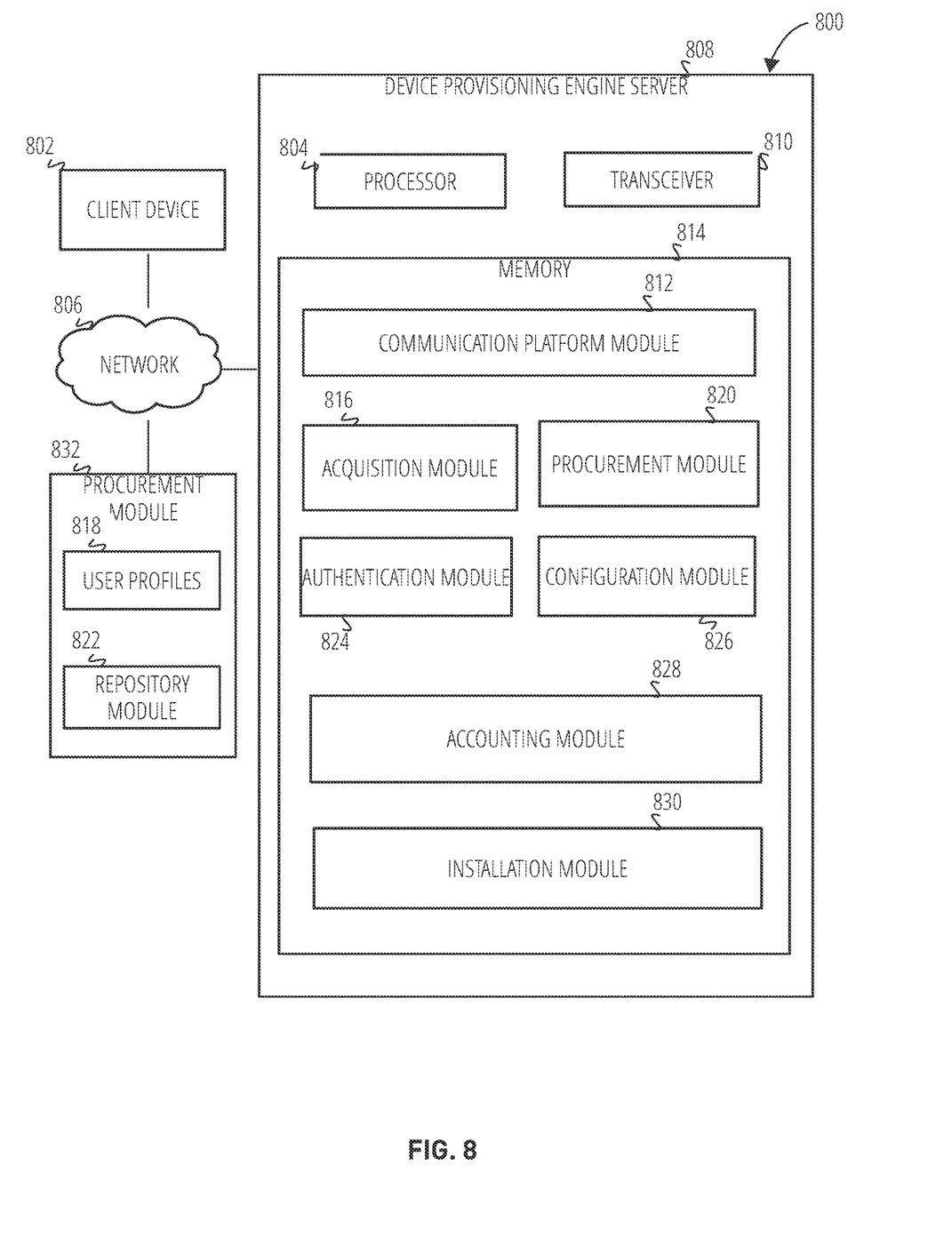
FIG. 8 is a block diagram of a computer system to implement one or more example embodiments.

The memory 726 includes any quantity of memory associated with or accessible by the computing device 702. The memory 726 may be internal to the client device 702, as shown in FIG. 8, external to the client device 100, not shown in FIG. 4, or both. Examples of memory 726 may include, without limitation, random access memory (RAM), read only memory (ROM), electronically erasable programmable read only memory (EEPROM), flash memory or other memory technologies, CDROM, digital versatile disks (DVDs) or other optical or holographic media, magnetic cassettes, magnetic tape, magnetic disk storage or other magnetic storage devices, memory wired into an analog computing device, or any other medium for encoding desired information and for access by the client device 702. The terms computer-readable medium, machine readable medium, and storage device do not include carrier waves to the extent carrier waves are deemed too transitory. Memory 726 may also take the form of volatile and/or nonvolatile memory; may be removable, non-removable, or a combination thereof; and may include various hardware devices, e.g., solid-state memory, hard drives, optical-disc drives, etc. Additionally, or alternatively, the memory 726 may be distributed across multiple client devices 702, e.g., in a virtualized environment in which instruction processing is carried out on multiple client devices 702. The memory 726 stores, among other data, various device applications that, when executed by the processor 708, operate to perform functionality on the client device 702. Examples of applications may include search applications, instant messaging applications, electronic-mail application programs, web browsers, calendar application programs, address book application programs, messaging programs, media applications, location-based services, search programs, and the like. The applications may communicate with counterpart applications or services such as web services accessible via the network 706. For example, the applications may include client-operating applications that correspond to server-side applications executing on remote servers or computing devices in the cloud.

Specifically, instructions stored in memory 726 comprise a communications interface application 728, a user interface application 730, and a streaming application 732. In some examples, the communications interface application 728 includes computer-executable instructions for operating a network interface card and/or a driver for operating the network interface card. Communication between the client device 702 and other devices may occur using any protocol or mechanism over a wired or wireless connection, or across the network 706. In some examples, the communications interface application 728 is operable with RF and short-range communication technologies using electronic tags, such as NFC tags, Bluetooth® brand tags, or the like.

In some examples, the user interface application 730 includes a graphics application for displaying data to the user and receiving data from the user. The user interface application 730 may also include computer-executable instructions for operating the graphics card to display search results and corresponding images or speech on or through the presentation components 712. The user interface application 730 may also interact with the various sensors 720 and camera 722 to both capture and present information through the presentation components 712.

FIG. 8 is a block diagram of a networking environment 800 for providing image search results and recommendations on client device(s) 802. The networking environment 800 may include multiple client devices 802, or just one as shown in FIG. 7, a device provisioning engine server 808 communicating over a network 806. In some examples, user and environment data are communicated by the client devices 802 over the network 806 to the Device provisioning engine server 808, and the Device provisioning engine server 808 provides or facilitates device procurement and/or provisioning for users of Client devices 802.

The networking environment 800 shown in FIG. 8 is merely an example of one suitable computing system environment and is not intended to suggest any limitation as to the scope of use or functionality of examples disclosed herein. Neither should the illustrated networking environment 800 be interpreted as having any dependency or requirement related to any single component, module, index, or combination thereof.

The network 806 may include any computer network, for example the Internet, a private network, local area network (LAN), wide area network (WAN), or the like. The network 806 may include various network interfaces, adapters, modems, and other networking devices for communicatively connecting the Client devices 802 and the device provisioning engine server 808. The network 806 may also include configurations for point-to-point connections. Computer networks are well known to one skilled in the art, and therefore do not need to be discussed in detail herein.

The client device 802 may be any type of client device discussed above in reference to FIG. 1. Each client device 802 may capture user and/or environment data from their respective users and communicate the captured user and environment data over the network 806 to the device provisioning engine server 808. To do so, each device may be equipped with a communications interface application 728 as discussed above in reference to FIG. 7. In response, the device provisioning overlay engine server 808 may be capable of providing records of procurement requests, records of procured devices, and other various records and indicators related to device procurement to client device 802 over the network 806.

The client device 802 may be equipped with various software applications and presentation components 712 for communicating via Communication platform module 812 for automatic provisioning integration of devices. For example, a mobile phone may display a communication platform (e.g., Microsoft Teams application) for communicating within an organization. The communication platform includes a feature that supports procurement and integration of new devices for the user or users of the communication platform. In some embodiments, new devices are procured and integrated for the user or users of the communication platform within a same organization. The illustrated client devices and the aforesaid presentation mechanisms are not an exhaustive list covering all examples. Many different variations of client devices 802 and presentation techniques may be used to procure and integrate devices.

The device provisioning engine server 808 represents a server or collection of servers configured to execute different web-service computer-executable instructions. The device provisioning engine server 808 includes a processor 804 to process executable instructions, a transceiver 810 to communicate over the network 806, and a memory 814 embodied with at least the following executable instructions: a communication platform module 812, acquisition module 816, procurement module 820, authentication module 824, and a configuration module 826. The memory 814 may also include instructions for accounting module 828 and installation module 830. Accounting module 828 may include price lists, cost of the procured devices, replacement device costs, and other details relating to the cost for procuring one or more devices. Installation module 830 may store applications, security certificates, configuration profiles, and other various files and applications available to be installed on one or more devices. While the device provisioning engine server 808 is illustrated as a single box, one skilled in the art will appreciate that the device provisioning engine server 808 may, in fact, be scalable. For example, the device provisioning engine server 808 may include multiple servers operating various portions of software that collectively provision and integrate devices for users of client devices (e.g., client device 802).

The procurement module 832 provides backend storage of Web, user, and environment data that may be accessed over the network 806 by the device provisioning engine server 808 or the client device 802 and used by the device provisioning engine server 808 to provision and integrate devices. The Web, user, and environment data stored in the database includes, for example but without limitation, user profiles 818, repository module 822, and so on. Repository module 822 may include historical logs of active, inactive, and pending devices along with faulty devices, devices out for repair, and other information related to devices within the network and/or organization associated with a user. Additionally, though not shown for the sake of clarity, the servers of the procurement module 832 may include their own processors, transceivers, and memory. Also, networking environment 800 depicts the procurement module 832 as a collection of separate devices from the device provisioning engine server 808 however, examples may actually store the discussed Web, user, and environment data shown in the procurement module 832 on the device provisioning engine server 808.

Herein, a "user profile" refers to an electronically stored collection of information related to the user. Such information may be stored based on a user's explicit agreement or "opt-in" to having such personal information be stored, the information including the user's name, age, gender, height, weight, demographics, current location, residency, citizenship, family, friends, schooling, occupation, hobbies, skills, interests, Web searches, health information, birthday, anniversary, celebrated holidays, moods, user's condition, and any other personalized information associated with the user. The user profile includes static profile elements, e.g., name, birthplace, etc., and dynamic profile elements that change over time, e.g., residency, age, condition, etc. The user profile may be built through probing questions to the user or through analyzing the user's behavior on one or more client devices.

Additionally, user profiles 818 may include static and/or dynamic data parameters for individual users. Examples of user profile data include, without limitation, a user's age, gender, race, name, location, interests, Web search history, social media connections and interactions, procurement history, routine behavior, jobs, or virtually any unique data points specific to the user. The user profiles 818 may be expanded to encompass various other aspects of a user's life.

The present disclosure relates to systems and methods for automatic provisioning and integration of devices according to at least the examples provided in the sections below:

(A1) In one aspect, some embodiments or examples include a method performed at a client device (e.g., user device 102), in data communication with a network (e.g., network 706).

The method includes authenticating a user using a first device (e.g., operation 602), accessing a network-based service (e.g., communication platform module 812), receiving a request for automatically provisioning a second device (e.g., operation 604), the provisioning comprising authenticating the second device, the provisioning associated with a request identifier. The request may be submitted via a graphical user interface corresponding to the network-based service. The method includes associating an authentication token and the request identifier with a provisioning data structure for the user, sending the request, the request identifier, and the authentication token associated with the second device to a third device distinct from the computer system, the first device, and the second device. The method includes receiving, from the third device, a unique identifier of the second device and the request identifier. The method includes locating the provisioning data structure using the request identifier and updating the provisioning data structure to include the unique identifier of the second device. The method includes receiving, at the network-based service, an authentication request for the second device including the authentication token and the unique identifier of the second device, the authentication token pre-provisioned on the second device by the third device. The method includes identifying the provisioning data structure based upon the unique identifier. In accordance with a determination that both the authentication token and the unique identifier included in the authentication request match both the authentication token and the unique identifier of the second device in the provisioning data structure, authenticating the second device, retrieving a configuration profile based on the provisioning data structure for the user, and causing application of the configuration profile to one or more settings of the second device.

(A2) In some embodiments of A1, the method includes generating a security certificate to be installed on the device, sending, the security certificate to the third device (e.g., device supplier, procurement center) to be installed on the second device, and where the authentication task includes, verifying the security certificate on the second device matches the generated security certificate.

(A3) In some embodiments of A1-A2, authenticating the second device includes displaying (e.g., operation 518 and 520) a one-time passcode at the graphical user interface and receiving, from the second device, an indication that the one-time passcode has been entered (e.g., operation 522).

(A4) In some embodiments of A1-A3, where the configuration profile for the device includes privacy, security, and access configurations for the device associated with the user.

(A5) In some embodiments of A1-A4, the method includes receiving, from the third device, an indication that the authentication token is pre-provisioned on the second device.

(A6) In some embodiments of A1-A5, the method includes storing, at the provisioning data structure, a physical location of the second device to be authenticated.

(A7) In some embodiments of A1-A6, the method includes determining the second device is at the physical location, in accordance with a determination the device is at the physical location, authenticating the second device.

(A8) In some embodiments of A1-A7, the method includes providing, at the graphical user interface, an indication that the second device has been successfully pre-provisioned and displaying a graphical representation of the second device.

(A9) In some embodiments of A1-A8, the method includes receiving, from the second device, an indication of a device error, and providing, to the user of the second device via the graphical user interface corresponding to the network-based service, an option to procure an alternate device.

(A10) In some embodiments of A1-A9, where the alternate device is distinct from the second device and of a same device type of the second device.

(B1) In another aspect, a system for automatically authenticating a hardware device for a user includes means for authenticating a user using a first device accessing a network-based service means for receiving a request, via a graphical user interface corresponding to the network-based service, for automatically provisioning a second device, the provisioning comprising authenticating the second device, the provisioning associated with a request identifier. The system includes means for associating an authentication token and the request identifier with a provisioning data structure for the user, means for sending the request, the request identifier, and the authentication token associated with the second device to a third device distinct from the first device and the second device, and means for receiving, from the third device, a unique identifier of the second device and the request identifier. The system includes means for locating the provisioning data structure using the request identifier and updating the provisioning data structure to include the unique identifier of the second device, means for receiving, at the network-based service, an authentication request for the second device including the authentication token and the unique identifier of the second device, the authentication token pre-provisioned on the second device by the third device, and means for identifying the provisioning data structure based upon the unique identifier. In accordance with a determination that both the authentication token and the unique identifier included in the authentication request match both the authentication token and the unique identifier of the second device in the provisioning data structure, the system includes means for authenticating the second device, means for retrieving a configuration profile based on the provisioning data structure for the user, and means for causing application of the configuration profile to one or more settings of the second device.

In yet another aspect, a system, comprising: a processor; and a memory device coupled to the processor and having a program stored thereon for execution by the processor to perform operations comprising any of the methods of A1-A10 described above.

In yet another aspect, some embodiments include a non-transitory computer-readable storage medium storing one or more programs for execution by one or more processors of a storage device, the one or more programs including instructions for performing any of the methods described herein (e.g., A1-A10 described above).

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

In the description herein, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized, and that structural, logical, and electrical changes may be made without departing from the scope of the present invention. The included description of example embodiments is, therefore, not to be taken in a limited sense, and the scope of the present invention is defined by the appended claims.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

What is claimed is:

1. A computer system for automatically authenticating a hardware device for a user, comprising:
   one or more processors; and
   a memory storing computer-executable instructions that, when executed, cause the one or more processors to perform operations of:
   authenticating the user using a first device accessing a network-based service;
   receiving a request, via a graphical user interface corresponding to the network-based service, for automatically provisioning a second device, the provisioning comprising authenticating the second device, the provisioning associated with a request identifier;
   associating an authentication token and the request identifier with a provisioning data structure for the user;
   sending the request, the request identifier, and the authentication token associated with the second device to a third device distinct from the computer system, the first device, and the second device;
   receiving, from the third device, a unique identifier of the second device and the request identifier;
   locating the provisioning data structure using the request identifier and updating the provisioning data structure to include the unique identifier of the second device;
   receiving, at the network-based service, an authentication request for the second device including the authentication token and the unique identifier of the second device, the authentication token pre-provisioned on the second device by the third device;
   identifying the provisioning data structure based upon the unique identifier;
   in accordance with a determination that both the authentication token and the unique identifier included in the authentication request match both the authentication token and the unique identifier of the second device in the provisioning data structure:
   authenticating the second device;
   retrieving a configuration profile based on the provisioning data structure for the user; and
   causing application of the configuration profile to one or more settings of the second device.

2. The computer system of claim 1, wherein sending the authentication token comprises:
   generating a security certificate for the second device;
   sending, the security certificate to the third device to be installed on the second device; and
   wherein authentication the second device includes verifying the security certificate on the second device matches the generated security certificate.

3. The computer system of claim 1, wherein authenticating the second device further comprises:
   displaying, at the graphical user interface corresponding to the network-based service, a one-time passcode; and
   receiving, from the second device, an indication that the one-time passcode has been entered.

4. The computer system of claim 1, wherein the configuration profile comprises privacy, security, and access configurations based at least in part on an access level of the user.

5. The computer system of claim 4, further comprises:
   receiving, from the third device, an indication that the authentication token is pre-provisioned on the second device.

6. The computer system of claim 1, further comprises:
   storing, at the provisioning data structure, a physical location of the second device to be authenticated.

7. The computer system of claim 6, further comprises:
   determining the second device is at the physical location; and
   in accordance with a determination the second device is at the physical location, authenticating the second device.

8. The computer system of claim 1, further comprises:
   providing, at the graphical user interface corresponding to the network-based service, an indication that the second device has been successfully pre-provisioned; and
   displaying a graphical representation of the second device.

9. The computer system of claim 8, further comprises:
   receiving, from the second device, an indication of a device error; and providing, to the user of the second device via the graphical user interface corresponding to the network-based service, an option to procure an alternate device.

10. The computer system of claim 9, wherein the alternate device is distinct from the second device and of a same device type of the second device.

11. A computer-implemented method for automatic device provisioning, the method comprising:
   authenticating a user using a first device accessing a network-based service;
   receiving a request, via a graphical user interface corresponding to the network-based service, for automatically provisioning a second device, the provisioning comprising authenticating the second device, the provisioning associated with a request identifier;
   associating an authentication token and the request identifier with a provisioning data structure for the user;
   sending the request, the request identifier, and the authentication token associated with the second device to a third device distinct from the first device and the second device;
   receiving, from the third device, a unique identifier of the second device and the request identifier;
   locating the provisioning data structure using the request identifier and updating the provisioning data structure to include the unique identifier of the second device;
   receiving, at the network-based service, an authentication request for the second device including the authentication token and the unique identifier of the second device, the authentication token pre-provisioned on the second device by the third device;
   identifying the provisioning data structure based upon the unique identifier;
   in accordance with a determination that both the authentication token and the unique identifier included in the authentication request match both the authentication token and the unique identifier of the second device in the provisioning data structure:
   authenticating the second device;
   retrieving a configuration profile based on the provisioning data structure for the user; and
   causing application of the configuration profile to one or more settings of the second device.

12. The computer-implemented method of claim 11, wherein sending the authentication token comprises:
   generating a security certificate for the second device;
   sending, the security certificate to the third device to be installed on the second device; and
   wherein authentication the second device includes verifying the security certificate on the second device matches the generated security certificate.

13. The computer-implemented method of claim 11, wherein authenticating the second device further comprises:
   displaying, at the graphical user interface corresponding to the network-based service, a one-time passcode; and
   receiving, from the second device, an indication that the one-time passcode has been entered.

14. The computer-implemented method of claim 11, wherein the configuration profile comprises privacy, security, and access configurations based at least in part on an access level of the user.

15. The computer-implemented method of claim 14, further comprises:
   receiving, from the third device, an indication that the authentication token is pre-provisioned on the second device.

16. The computer-implemented method of claim 14, further comprises:
   storing, at the provisioning data structure, a physical location of the second device to be authenticated.

17. The computer-implemented method of claim 16, further comprises:
   determining the second device is at the physical location; and
   in accordance with a determination the second device is at the physical location, authenticating the second device.

18. The computer-implemented method of claim 11, further comprises:
   providing, at the graphical user interface corresponding to the network-based service, an indication that the device has been successfully pre-provisioned; and
   displaying a graphical representation of the second device.

19. The computer-implemented method of claim 18, further comprises:
   receiving, from the second device, an indication of a device error; and
   providing, to the user of the second device via the graphical user interface corresponding to the network-based service, an option to procure an alternate device.

20. A system for automatically authenticating a hardware device for a user, the system comprising:
   means for authenticating the user using a first device accessing a network-based service;
   means for receiving a request, via a graphical user interface corresponding to the network-based service, for automatically provisioning a second device, the provisioning comprising authenticating the second device, the provisioning associated with a request identifier;
   means for associating an authentication token and the request identifier with a provisioning data structure for the user;
   means for sending the request, the request identifier, and the authentication token associated with the second device to a third device distinct from the first device and the second device;
   means for receiving, from the third device, a unique identifier of the second device and the request identifier;
   means for locating the provisioning data structure using the request identifier and updating the provisioning data structure to include the unique identifier of the second device,
   means for receiving, at the network-based service, an authentication request for the second device including the authentication token and the unique identifier of the second device, the authentication token pre-provisioned on the second device by the third device;
   means for identifying the provisioning data structure based upon the unique identifier;
   in accordance with a determination that both the authentication token and the unique identifier included in the authentication request match both the authentication token and the unique identifier of the second device in the provisioning data structure, the system including:
   means for authenticating the second device;
   means for retrieving a configuration profile based on the provisioning data structure for the user; and
   means for causing application of the configuration profile to one or more settings of the second device.

* * * * *